United States Patent
Morita (10) Patent No.: US 9,977,411 B2
(45) Date of Patent: May 22, 2018

(54) MOTOR CONTROL APPARATUS WITH MAGNETIC FLUX CONTROLLER AND MACHINE LEARNING APPARATUS AND METHOD THEREFOR

(71) Applicant: FANUC CORPORATION, Yamanashi (JP)

(72) Inventor: Yuuki Morita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/223,022

(22) Filed: Jul. 29, 2016

(65) Prior Publication Data

US 2017/0031331 A1    Feb. 2, 2017

(30) Foreign Application Priority Data

Jul. 31, 2015  (JP) .................................. 2015-152469

(51) Int. Cl.
  *G05B 13/02* (2006.01)
  *G05B 11/01* (2006.01)
  (Continued)

(52) U.S. Cl.
  CPC .......... *G05B 13/0265* (2013.01); *G05B 11/01* (2013.01); *G06N 5/045* (2013.01);
  (Continued)

(58) Field of Classification Search
  None
  See application file for complete search history.

(56) References Cited

U.S. PATENT DOCUMENTS 8,203,304 B2 *  6/2012  Lu ........................ H02P 23/0004
                                                          318/778
8,525,454 B2 *  9/2013  Kimpara ............... H02P 29/032
                                                          318/400.02
(Continued)

FOREIGN PATENT DOCUMENTS

CN          1431769 A     7/2003
CN        102299681 A    12/2011
(Continued)

OTHER PUBLICATIONS

Wang, Shun-Chung, et al. "Adaptive iterative learning control of switched reluctance motors for minimizing energy conversion loss and torque ripple." Power Electronics Specialists Conference, 2007. PESC 2007. IEEE. IEEE, 2007.*

(Continued)

*Primary Examiner* — Kakali Chaki
*Assistant Examiner* — Daniel Pellett
(74) *Attorney, Agent, or Firm* — Hauptman Ham, LLP (57) ABSTRACT

A machine learning apparatus that learns a condition associated with a gain of a magnetic flux controller and a time constant of a magnetic flux estimator in a motor control apparatus includes: a state observation unit that observes a state variable defined by at least one of data relating to an acceleration of a motor, data relating to a jerk of the motor, and data relating to an acceleration time of the motor; and a learning unit that learns the condition associated with the gain of the magnetic flux controller and the time constant of the magnetic flux estimator in accordance with a training data set defined by the state variable.

9 Claims, 8 Drawing Sheets

(51) Int. Cl.
  G06N 5/04  (2006.01)
  H02P 21/00  (2016.01)
  H02P 21/13  (2006.01)
  H02P 21/14  (2016.01)
  H02P 21/34  (2016.01)
  G06N 99/00  (2010.01)
  H02P 21/06  (2016.01)

(52) U.S. Cl.
  CPC .............. *H02P 21/00* (2013.01); *H02P 21/13* (2013.01); *H02P 21/141* (2013.01); *H02P 21/34* (2016.02); *G05B 2219/33322* (2013.01); *G05B 2219/42129* (2013.01); *G06N 99/005* (2013.01); *H02P 21/06* (2013.01)

(56) References Cited

U.S. PATENT DOCUMENTS

| | | | |
|---|---|---|---|
| 2003/0151385 A1* | 8/2003 | Wu | ........................ H02P 21/10 318/727 |
| 2008/0191656 A1 | 8/2008 | Satake et al. | |

FOREIGN PATENT DOCUMENTS

| | | |
|---|---|---|
| JP | 2007-164406 A | 6/2007 |
| JP | 2013066342 A | 4/2013 |
| WO | 2005/112249 A1 | 11/2005 |
| WO | 2013/057780 A1 | 4/2013 |

OTHER PUBLICATIONS

Zarchi, H. Abootorabi, et al. "Emotional controller (BELBIC) based DTC for encoderless Synchronous Reluctance Motor drives." Power Electronics, Drive Systems and Technologies Conference (PEDSTC), 2011 2nd. IEEE, 2011.*

Rahman, M. Azizur, et al. "Implementation of emotional controller for interior permanent-magnet synchronous motor drive." IEEE Transactions on Industry Applications 44.5 (2008): 1466-1476.*

Sahoo, Sanjib K., Sanjib K. Panda, and Jian-Xin Xu. "Indirect torque control of switched reluctance motors using iterative learning control." IEEE Transactions on Power Electronics 20.1 (2005): 200-208.*

Xue, X. D., K. W. E. Cheng, and S. L. Ho. "Optimization and evaluation of torque-sharing functions for torque ripple minimization in switched reluctance motor drives." IEEE transactions on power electronics 24.9 (2009): 2076-2090.*

Sutikno, Tole, Mochammad Facta, and GR Arab Markadeh. "Progress in Artificial Intelligence Techniques: from Brain to Emotion." TELKOMNIKA (Telecommunication Computing Electronics and Control) 9.2 (2013): 201-202.*

Daryabeigi, E., and C. Lucas. "Simultaneously, speed and flux control of a induction motor, with brain emotional learning based intelligent controller (BELBIC)." Electric Machines and Drives Conference, 2009. IEMDC'09. IEEE International. IEEE, 2009.*

Markadeh, G. R., et al. "Speed and flux control of induction motors using emotional intelligent controller." IEEE Transactions on Industry Applications 47.3 (2011): 1126-1135.*

Kaliappan, E., and C. Sharmeela. "Torque ripple minimization of permanent magnet brushless DC motor using genetic algorithm." Power Electron. Instrum. Eng 2 (2010): 53-55.*

Kim, Dong-Hee, Hae-Gwang Jeong, and Kyo-Beum Lee. "Torque ripple minimization of switched reluctance motors based on fuzzy logic and sliding mode control." Industrial Electronics (ISIE), 2013 IEEE International Symposium on. IEEE, 2013.*

Fu, Xingang, and Shuhui Li. "A novel neural network vector control technique for induction motor drive." IEEE Transactions on Energy Conversion 30.4 (2015): 1428-1437.*

* cited by examiner

MOTOR CONTROL APPARATUS WITH MAGNETIC FLUX CONTROLLER AND MACHINE LEARNING APPARATUS AND METHOD THEREFOR

RELATED APPLICATIONS

The present application claims priority to Japanese Patent Application Number 2015-152469, filed Jul. 31, 2015, the disclosure of which is hereby incorporated by reference herein in its entirety.

BACKGROUND OF THE INVENTION

1. Field of the Invention

The present invention relates to a motor control apparatus with a magnetic flux controller, and a machine learning apparatus and a method therefor.

2. Description of the Related Art

Among motor control apparatuses which are used to drive-control a motor is one in which a magnetic flux state of an induction motor is estimated by a magnetic flux estimator based on an input speed command and the magnetic flux is controlled by a magnetic flux controller as disclosed in Japanese Patent Unexamined Patent Publication No. 2013-66342, for example.

While, in a steady state, a magnitude of magnetic flux in an induction motor (hereinafter, referred to simply as "motor") becomes a value proportional to an excitation current which is a current for forming the magnetic flux, the magnitude of magnetic flux varies with a delay for a time constant depending on a circuit constant of the motor with respect to a variation in the excitation current when varying it such as during an acceleration or a deceleration of the motor. When a current control is performed without the delay being taken into account, there is sometimes a case where a transient phenomenon in which undulation is caused in a speed waveform occurs due to a discontinuous variation in torque when the magnetic flux varies during acceleration or deceleration of the motor.

With an object to solve the above problem, a magnetic flux controller is incorporated in the motor control apparatus, which controls a follow-up excitation current command such that the amount of the magnetic flux is estimated based on the excitation current or excitation current command and the above time constant and the value of the estimation follows a magnetic flux command value as quickly as possible. The time constant for the delay of the magnetic flux variation with respect to the excitation current is a value that depends on the motor circuit constant, and since in an actual motor, there is a case where the time constant does not become as designed, there is a case where it is preferable to adjust the time constant of the magnetic flux estimator so as to conform to that of an actual device. Further, it is possible to improve the follow-up property of the actual magnetic flux with respect to a magnetic flux command by increase the gain of the magnetic flux controller, but when the gain is excessively increased, the current control becomes unstable. Thus, it is desirable to adjust the time constant of the magnetic flux estimator and the gain of the magnetic flux controller to an appropriate value.

Each parameter such as the gain of the magnetic flux controller and the time constant of the magnetic flux estimator has been determined on the basis of the quality thereof by the operator observing by himself/herself the speed waveform of the motor during acceleration and deceleration when a predetermined speed command (e.g., step-like input) is inputted to the motor control apparatus; therefore, an amount of time and effort has heretofore been required in determining optimum parameters.

SUMMARY OF THE INVENTION

In view of the above, an object of the present invention is to provide a motor control apparatus that is capable of performing optimization of a gain of a magnetic flux controller and a time constant of a magnetic flux estimator, and a machine learning apparatus and a method therefor.

To achieve the above object, the machine learning apparatus that learns a condition associated with the gain of the magnetic flux controller and the time constant of the magnetic flux estimator in the motor control apparatus includes: a state observation unit that observes a state variable defined by at least one of data relating to an acceleration of a motor, data relating to a jerk of the motor, and data relating to an acceleration time of the motor, and a learning unit that learns the condition associated with the gain of the magnetic flux controller and the time constant of the magnetic flux estimator in accordance with a training data set defined by the state variable.

The learning unit may include a reward calculation unit that calculates a reward based on the state variable, and a function update unit that updates a function for changing the gain of the magnetic flux controller and the time constant of the magnetic flux estimator.

Further, the reward calculation unit may be configured to reduce the reward when the polarity of the acceleration of the motor observed by the state observation unit is changed during an acceleration period or a deceleration period of the motor.

Further, the reward calculation unit may be configured to reduce the reward when a number of times that the polarity of the jerk of the motor observed by the state observation unit is changed during an acceleration period or a deceleration period of the motor is larger than or equal to a predetermined value.

Further, the reward calculation unit may be configured to increase the reward when an acceleration time of the motor observed by the state observation unit during an acceleration period or a deceleration period of the motor is shorter than an acceleration time of the motor observed by the state observation unit during an acceleration period or a deceleration period prior to the current acceleration or deceleration period.

The learning unit may be configured to learn the above-described condition in accordance with a training data set acquired with respect to a plurality of motor control apparatuses.

The motor control apparatus including the above-described machine learning apparatus further includes: a motor control unit that includes a magnetic flux controller and a magnetic flux estimator; a speed detection unit that detects a speed of the motor; an acceleration calculation unit that calculates an acceleration from the speed of the motor detected by the speed detection unit; a jerk calculation unit that calculates a jerk from the acceleration of the motor calculated by the acceleration calculation unit; an acceleration time measurement unit that measures an acceleration time of the motor; and a decision-making unit that determines a gain of the magnetic flux controller and a time constant of the magnetic flux estimator in response to input of a current state variable based on the result of learning by the learning unit in accordance with the training data set.

The learning unit may be configured to relearn and update the condition in accordance with an additional training data set defined by a current state variable.

Further, the machine learning method for learning a condition associated with the gain of the magnetic flux controller and the time constant of the magnetic flux estimator in the motor control apparatus includes: a state observation step that observes a state variable defined by at least one of data relating to an acceleration of the motor, data relating to a jerk of the motor, and data relating to an acceleration time of the motor; and a learning step that learns the condition associated with the gain of the magnetic flux controller and the time constant of the magnetic flux estimator in accordance with a training data set defined by the state variable.

BRIEF DESCRIPTION OF THE DRAWINGS

The present invention will be more clearly understood by reference to the accompanying drawings, in which.

DETAILED DESCRIPTION

A motor control apparatus with a magnetic flux controller, a machine learning apparatus, and a method therefor will be described below with reference to the drawings. However, it should be understood that the present invention is not limited to the drawings or the following embodiments.

Figure 1:
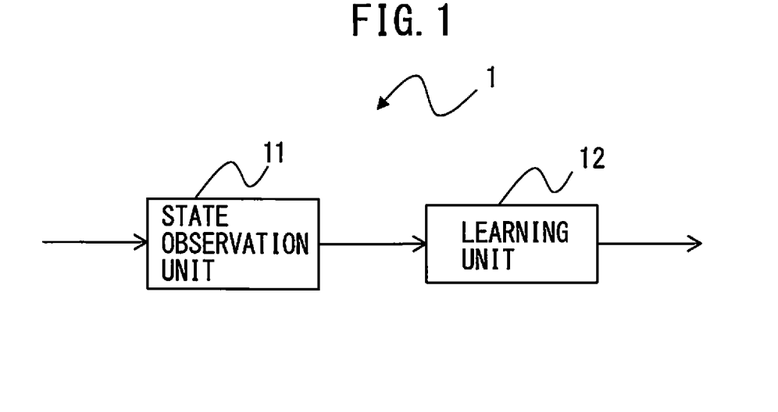
FIG. 1 is a principle block diagram of a machine learning apparatus according to an embodiment.

FIG. 1 is a principle block diagram of a machine learning apparatus according to an embodiment. Let it be assumed hereinafter that components assigned identical reference numerals throughout different drawings have identical functions.

The machine learning apparatus 1 according to the embodiment is configured to learn conditions associated with a gain of the magnetic flux controller and a time constant of a magnetic flux estimator in the motor control apparatus.

The machine learning apparatus 1 includes a state observation unit 11 and a learning unit 12.

The state observation unit 11 observes, as a training data set, a state variable defined by at least one of data relating to an acceleration of a motor, data relating to a jerk of the motor, and data relating to an acceleration time of the motor.

The learning unit 12 learns the gain of the magnetic flux controller and the time constant of the magnetic flux estimator in accordance with the training data set defined by the state variable. Meanwhile, the training data set may be acquired from a plurality of motor control apparatuses, and in such an instance, the learning unit 12 learns the gain of the magnetic flux controller and the time constant of the magnetic flux estimator in accordance with the training data set acquired with respect to the plurality of motor control apparatuses.

Figure 2:
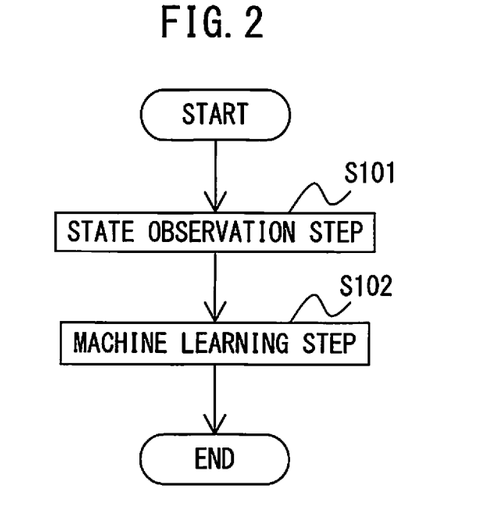
FIG. 2 is a flow chart illustrating the operating principle of a machine learning method according to an embodiment.

FIG. 2 is a flow chart illustrating the operation principle of the machine learning method according to the embodiment. The machine learning method, which learns a condition associated with the gain of the magnetic flux controller and the time constant of the magnetic flux estimator in the motor control apparatus, includes a state observation step S101 and a machine learning step S102.

The state observation step S101 is performed by the state observation unit 11, i.e., observes a state variable defined by at least one of data relating to an acceleration of the motor, data relating to a jerk of the motor, and data relating to an acceleration time of the motor.

The machine learning step S102 is performed by the learning unit 12, and learns conditions associated with the gain of the magnetic flux controller and the time constant of the magnetic flux estimator in accordance with the training data set defined by the state variable.

The learning unit 12 may use whatever learning algorithm. Description is made, by way of example, of a case in which reinforcement learning is applied. Reinforcement learning is such that an agent (acting subject) in some environment observes a current state and decides an action to take. The agent obtains a reward from the environment by selecting an action, and learns a policy such that the most reward can be obtained through a series of actions. As typical reinforcement learning techniques, there are known Q-learning and TD-learning. For example, in the case of Q-learning, a general update equation (an action value table) for an action-value function $Q(s, a)$ is represented by the following formula (1):

$$Q(s_t,a_t) \leftarrow Q(s_t,a_t) + \alpha(r_{t+1} + \gamma \max Q(s_{t+1}, a) - Q(s_t,a_t)) \quad (1)$$

In the formula (1), $s_t$ represents an environment at a time t, and $a_t$ represents an action at the time t. The environment changes to $s_{t+1}$ via the action $a_t$. $r_{t+1}$ represents a reward that can be gotten as a result of the change of the environment, $\gamma$ represents a discount rate, and $\alpha$ represents a learning rate.

When Q-learning is applied, the gain of the magnetic flux controller and the time constant of the magnetic flux estimator become the action $a_t$.

Figure 3:
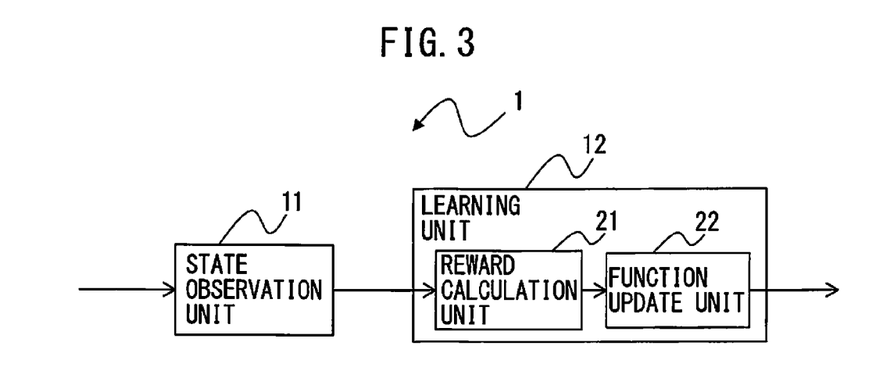
FIG. 3 is a principle block diagram of a machine learning apparatus using reinforcement learning according to an embodiment.

FIG. 3 is a principle block diagram of the machine learning apparatus using reinforcement learning according to the embodiment. The learning unit 12 includes a reward calculation unit 21 and a function update unit 22. The reward calculation unit 21 calculates a reward based on a state variable. The function update unit 22 updates, based on the reward, the function for changing the gain of the magnetic flux controller and the time constant of the magnetic flux estimator. For example, in the case of Q-learning, the action-value function Q (s, a) represented by the formula (1) is used as the function for changing the gain of the magnetic flux controller and the time constant of the magnetic flux estimator, which constitute the action $a_t$. Meanwhile, since other circuit components are similar to the circuit components illustrated in FIG. 1, identical circuit components are assigned identical reference numerals, and detailed description thereof is omitted.

Figure 4:
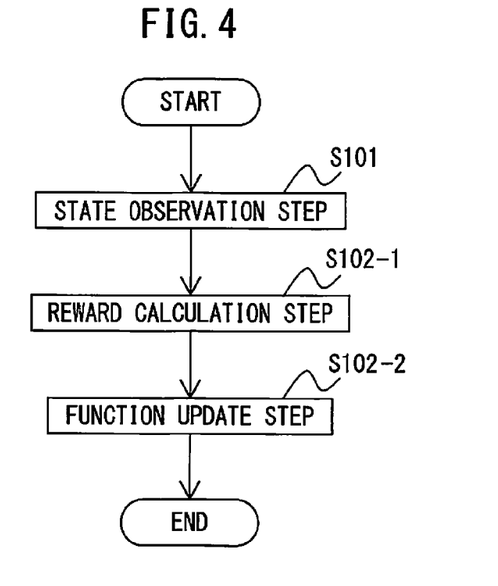
FIG. 4 is a flow chart illustrating the principle of a machine learning method using reinforcement learning according to an embodiment.

FIG. 4 is a flow chart illustrating the principle of the machine learning method using reinforcement learning according to the embodiment.

First, at the state observation step S101, the state observation unit 11 observes a state variable defined by at least one of data relating to an acceleration of the motor, data relating to a jerk of the motor, and data relating to an acceleration time of the motor.

Then, at a reward calculation step S102-1, the reward calculation unit 21 calculates a reward based on the state variable observed at step S101.

Then, at a function updating step S102-2, the function update unit 22 updates, based on the reward, the function for changing the gain of the magnetic flux controller and the time constant of the magnetic flux estimator.

Subsequently, description is made of the motor control apparatus including the above-described machine learning apparatus. By way of example herein, description is made of a case in which reinforcement learning is used as a learning algorithm for the learning unit.

Figure 5:
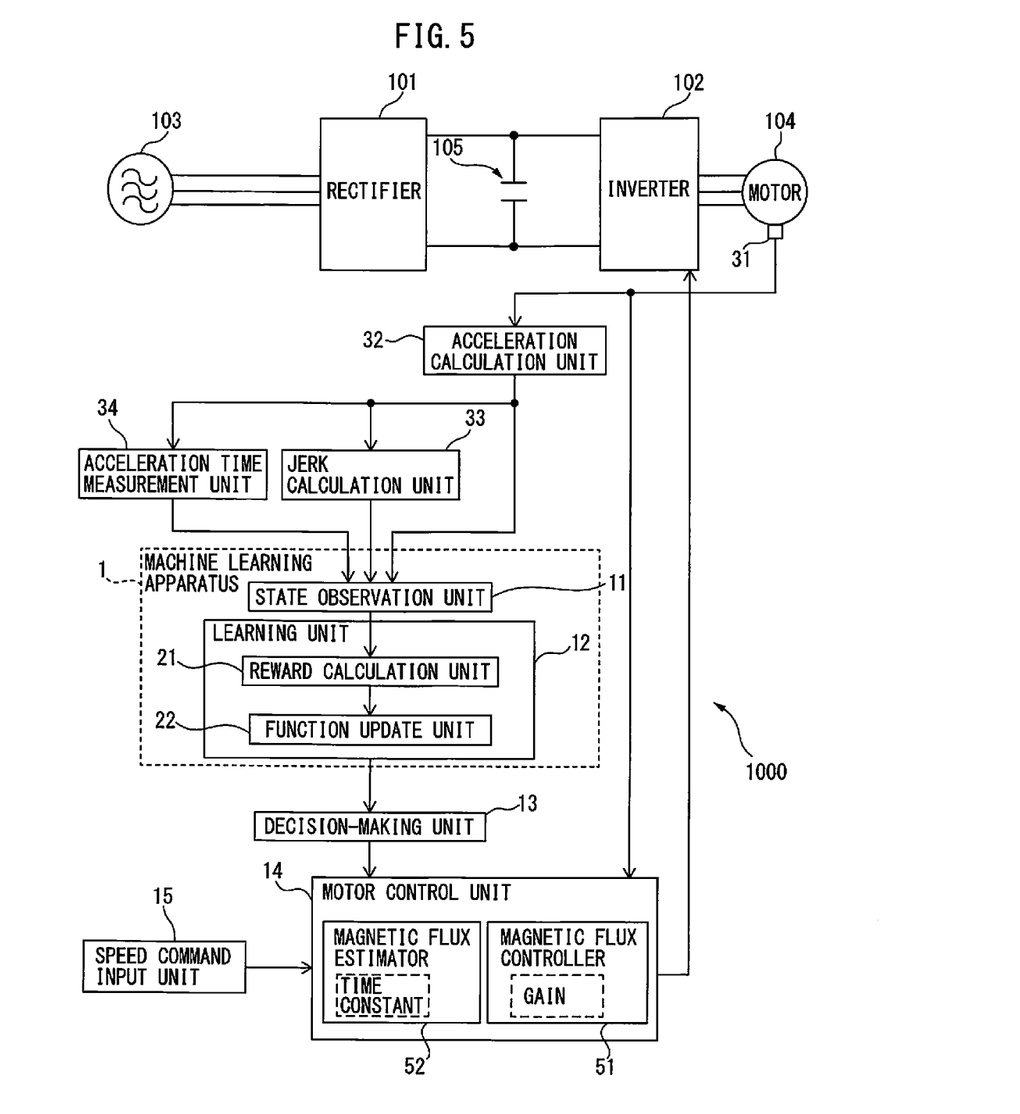
FIG. 5 is a principle block diagram illustrating a motor control apparatus including a machine learning apparatus according to an embodiment.
Figure 6:
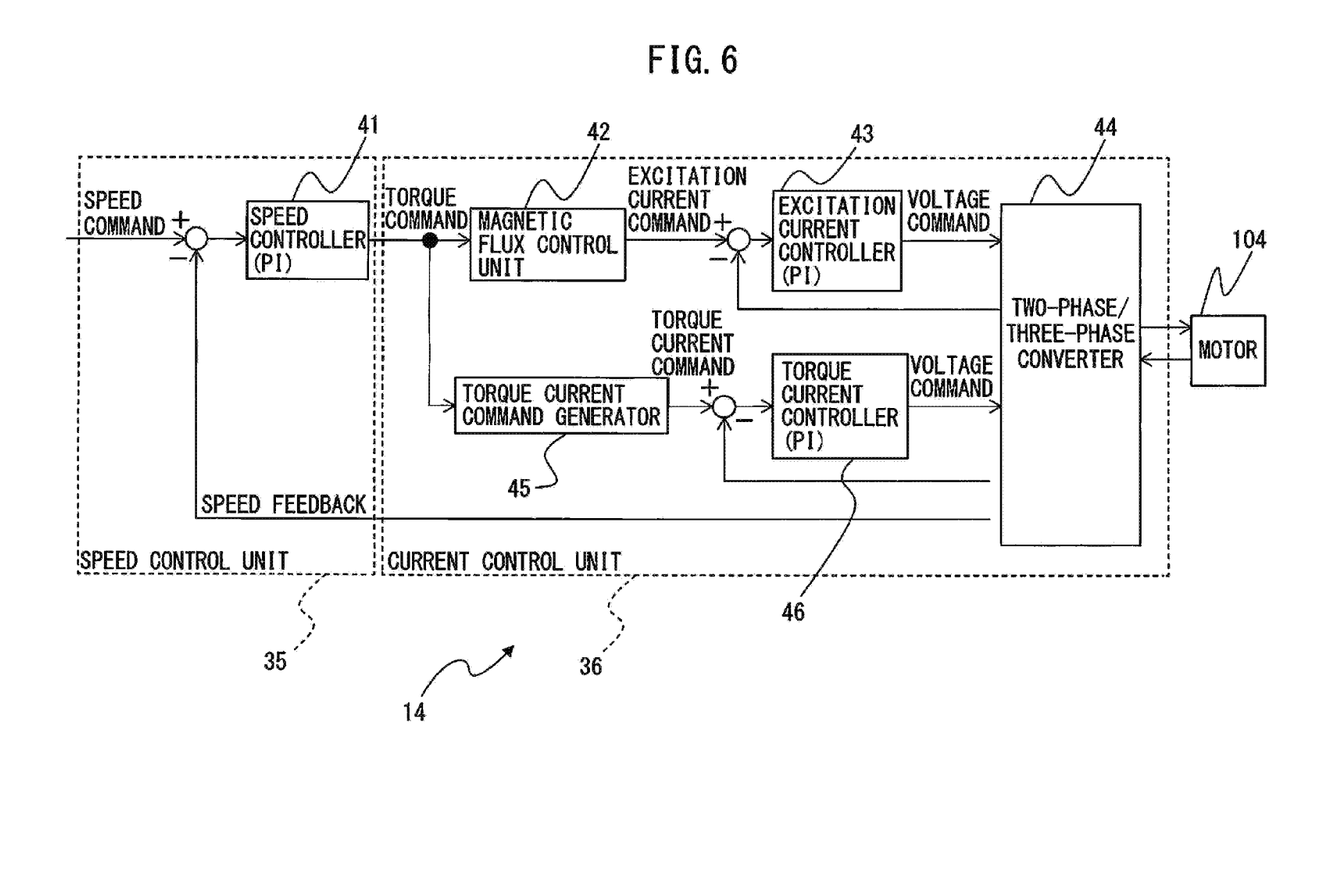
FIG. 6 is a principle block diagram illustrating a motor control unit in the motor control apparatus of FIG. 5.
Figure 7A:
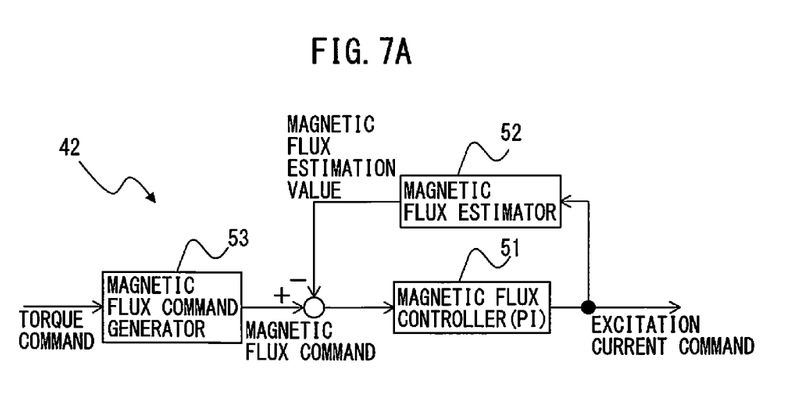
FIG. 7A is a principle block diagram illustrating a magnetic flux control unit in the motor control unit of FIG. 6, wherein the magnetic flux control unit is illustrated.
Figure 7B:
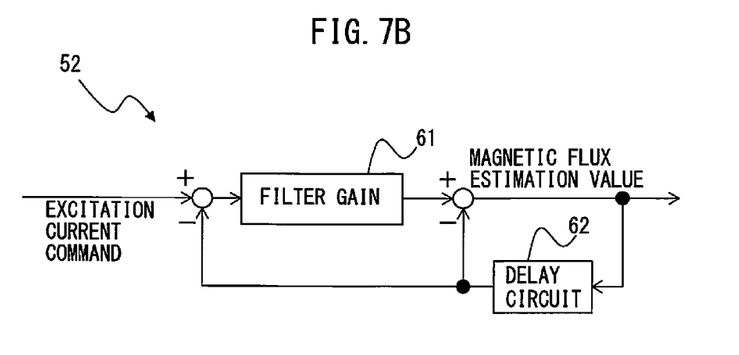
FIG. 7B is a principle block diagram illustrating the magnetic flux control unit in the motor control unit of FIG. 6, wherein a magnetic flux estimator in the magnetic flux control unit is illustrated.

FIG. 5 is a principle block diagram illustrating the motor control apparatus including the machine learning apparatus according to the embodiment. FIG. 6 is a principle block diagram illustrating a motor control unit in the motor control apparatus of FIG. 5. Further, FIG. 7A is a principle block diagram illustrating a magnetic flux control unit in the motor control unit of FIG. 6, wherein the magnetic flux control unit is illustrated. FIG. 7B is a principle block diagram illustrating a magnetic control unit in the motor control unit of FIG. 6, wherein a magnetic flux estimator in the magnetic flux control unit is illustrated. Description is made herein of a motor control apparatus 1000 that drive-controls a single motor 104.

The motor control apparatus 1000 includes, as main circuit components, a rectifier 101, an inverter 102, and a DC link capacitor 105. An AC power supply 103 is connected to a three-phase input side of the motor control apparatus 1000, and a three-phase motor 104 is connected to an AC motor side of the motor control apparatus 1000.

The rectifier 101 converts AC power supplied from the AC power supply 103 side to DC power and outputs the DC power to the DC link. In the present invention, the form in which the inverter 101 in use is embodied is not particularly limited, and a diode rectifier, a rectifier circuit of the PWM controlled type, or the like may be available, for example.

While the inverter 102, which is connected to the DC link, converts DC power at the DC link to AC power and supplies the AC power to the motor 104, it is generally a power converter that is capable of performing bidirectional AC/DC conversion. In other words, the inverter 102 is capable of performing bidirectional power conversion between the DC power at the DC link and driving power or regenerative power of the motor 104, and performs either regenerative operation (inversion operation) that converts DC power to AC power or power-running operation (rectification operation) that converts AC power to DC power, in accordance with a motor drive command received from a motor control unit 14. Specifically, the inverter 102 converts DC power supplied from the DC link side to three-phase AC power of a desired voltage and a desired frequency that allows an internal switching element to perform a switching operation to drive the motor 104 based on the motor drive command received from the motor control unit 14. In this manner, the motor 104 operates based on the supplied three-phase AC power of a variable voltage and a variable frequency. Further, regenerative power is generated when the motor 104 is decelerated, but in this instance, the AC regenerative power generated at the motor 104 is converted to DC power and returned to the DC link based on the motor drive command received from the motor control unit 14. The inverter 102 is constituted by a bridge circuit of a switching element and a diode connected in reverse parallel thereto, such as a PWM inverter or the like, for example.

Further, the motor control apparatus 1000 includes, as its control system and measurement system, the machine learning apparatus 1 using reinforcement learning described with reference to FIGS. 3 and 4, a decision-making unit 13, the motor control unit 14, a speed command input unit 15, a speed detection unit 31, an acceleration calculation unit 32, a jerk calculation unit 33, and an acceleration time measurement unit 34.

The speed detection unit 31 detects a speed of the motor 104.

The acceleration calculation unit 32 calculates an acceleration of the motor 104 from the speed detected by the speed detection unit 31.

A jerk calculation unit 33 calculates a jerk from the acceleration of the motor calculated by the acceleration calculation unit 32.

An acceleration time measurement unit 34 measures an acceleration time of the motor 104.

The motor control unit 14 includes a speed control unit 35 and a current control unit 36. The magnetic flux control unit 42 in the current control unit 36 includes a magnetic flux controller 51 and the magnetic flux estimator 52, which perform an appropriate current control in conformity to the circuit characteristic of the motor 104 under a transient condition, such as acceleration, deceleration or the like, thereby generating a torque as commanded by a torque command. A detailed configuration of the motor control unit 14 will be described hereinafter.

The reward calculation unit 21 in the learning unit 12 calculates a reward based on a state variable observed by the state observation unit 11.

The state observation unit 11 observes a state variable defined by at least one of data relating to an acceleration of the motor 104, data relating to a jerk of the motor 104, and data relating to an acceleration time of the motor 104. The state variable as observed is used for learning in the learning unit 12 as a training data set. The acceleration of the motor 104 is calculated by the acceleration calculation unit 32, the jerk of the motor 104 is calculated by the jerk calculation unit 33, and the acceleration time of the motor 104 is measured by the acceleration time measurement unit 34.

The reward calculation unit 21 in the learning unit 12 calculates a reward based on the state variable observed by the state observation unit 11.

Figure 8A:
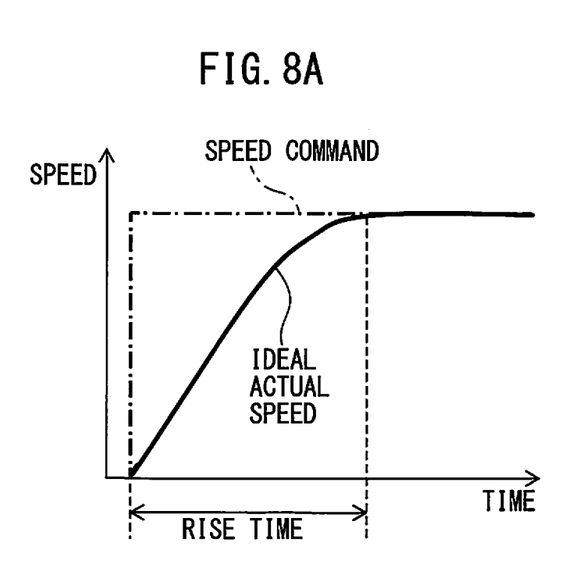
FIG. 8A is a view for explaining a reward calculation process by a reward calculation unit, wherein there is illustrated an ideal speed waveform when a step-like speed command is provided.
Figure 8B:
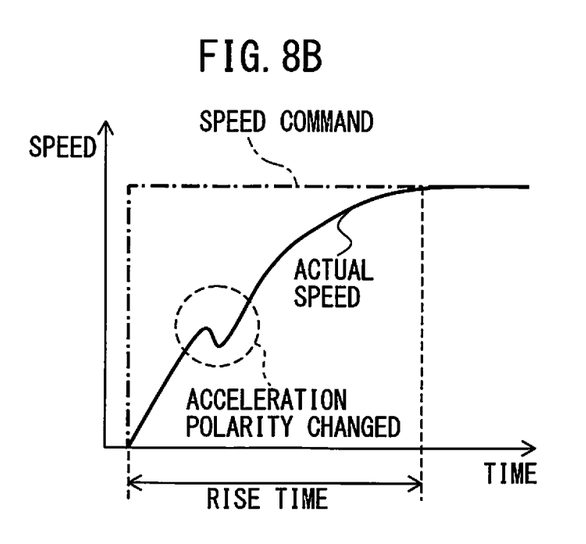
FIG. 8B is a view for explaining a reward calculation process by a reward calculation unit, wherein there is illustrated a speed waveform which is observed when a step-like speed command is provided under a gain of the magnetic flux controller before being optimized.

In a case where the state variable is defined by the data relating to the acceleration of the motor, the reward calculation unit 21 reduces the reward when the polarity of acceleration of the motor 104 observed by the state observation unit 11 is changed during an acceleration period or a deceleration period of the motor 104. With reference to FIGS. 8A and 8B, description is made of the reason that the reward is reduced when the polarity of acceleration of the motor 104 is changed during an acceleration period or a deceleration period, by exemplifying a case where a step-like speed command is provided. FIG. 8A is a view for explaining a reward calculation process by the reward calculation unit, wherein there is illustrated an ideal speed waveform when a step-like speed command is provided. FIG. 8B is a view for explaining a reward calculation process by the reward calculation unit, wherein there is illustrated a speed waveform which is observed when a step-like speed command is provided under a gain of the magnetic flux controller 51 before being optimized. Ideally, the speed waveform becomes as indicated by a solid line which is observed when a step-like speed command such as indicated by a dot dash line of FIG. 8A is provided to the motor control unit 14; however, when the gain of the magnetic flux controller 51 is not optimized, a transient decrease occurs in the speed waveform as illustrated in FIG. 8B (indicated by a solid line in the drawing). Such a transient speed decrease corresponds to a change in polarity when substitution is made with an acceleration waveform. In this manner, since when the polarity of acceleration is changed during an acceleration period or a deceleration period of the motor 104, it means that the gain of the magnetic flux controller 51 is not optimized, the reward is reduced in the present embodiment.

Figure 9A:
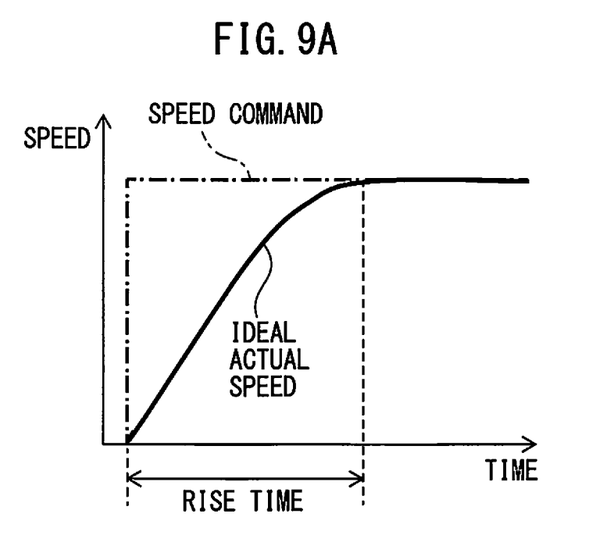
FIG. 9A is a view for explaining a reward calculation process by a reward calculation unit, wherein there is illustrated an ideal speed waveform when a step-like speed command is provided.
Figure 9B:
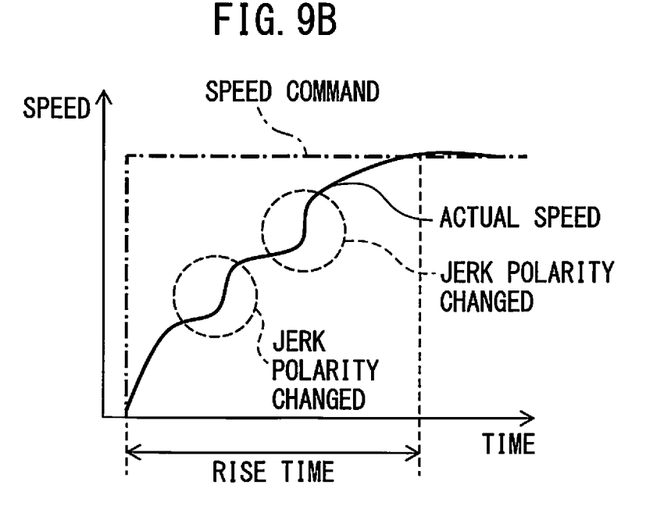
FIG. 9B is a view for explaining a reward calculation process by a reward calculation unit, wherein there is illustrated a speed waveform which is observed when a step-like speed command is provided under a time constant of the magnetic flux estimator before being optimized.

In the case where the state variable is defined by the data relating to a jerk of the motor, the reward calculation unit 21 reduces the reward when the number of times that the polarity of jerk of the motor 104 observed by the state observation unit 11 is changed during an acceleration period or a deceleration period of the motor 104 is larger than or equal to a predetermined value. With reference to FIGS. 9A and 9B, description will be made of the reason that the reward is reduced when the number of times that the polarity of jerk of the motor 104 is changed during an acceleration period or a deceleration period is larger than or equal to a predetermined value, by exemplifying a case where a step-like speed command is provided. FIG. 9A is a view for explaining a reward calculation process by the reward calculation unit, wherein there is illustrated an ideal speed waveform when a step-like speed command is provided. FIG. 9B is a view for explaining a reward calculation process by the reward calculation unit, wherein there is illustrated a speed waveform which is observed when a step-like speed command is provided under a time constant of the magnetic flux estimator 52 before being optimized. Ideally, the speed waveform observed by the state observation unit 11 becomes as indicated by a solid line with respect to a step-like speed command such as indicated by a dot dash line of FIG. 9A; however, when the time constant of the magnetic flux estimator 52 is not optimized, a so-called "undulation" in which the degree of acceleration (i.e., jerk) is weakened occurs in the speed waveform (indicated by a solid line in the drawing) as illustrated in FIG. 9B (twice in the illustrated example). Such undulation corresponds to a change of the polarity when substitution is made with a jerk.

Thus, in the present embodiment, the reward is reduced when the number of times that the polarity of jerk is changed during an acceleration period or a deceleration period of the motor 104 is larger than or equal to a predetermined value. The above "predetermined value" may be set arbitrarily by the operator, and it may be configured such that the reward is reduced when an undulation occurs even once or when a plurality of undulations occur, for example.

In the case where the state variable is defined by the data relating to the acceleration time of the motor, the reward calculation unit 21 increases the reward when the acceleration time of the motor 104 observed by the state observation unit 11 during an acceleration period or a deceleration period of the motor 104 is shorter than the acceleration time of the motor observed by the state observation unit 11 during an acceleration period or a deceleration period prior to the current acceleration period or deceleration period (i.e., when the acceleration time becomes shorter). The reason that the reward is increased in such an instance is because it is meant that the shorter the time taken to follow the speed command, the closer to an optimum value are the gain of the magnetic flux controller 51 and the time constant of the magnetic flux estimator 52 in use.

The function update unit 22 in the learning unit 12 updates the function for changing the gain of the magnetic flux controller 51 and the time constant of the magnetic flux estimator 52 based on the reward calculated by the reward calculation unit 21. In the case of Q-learning, for example, the action-value function Q(s, a) represented by the formula (1) is used as the function for changing the gain of the magnetic flux controller 51 and the time constant of the magnetic flux estimator 52.

The decision-making unit 13 determines the gain of the magnetic flux controller 51 and the time constant of the magnetic flux estimator 52 based on the result of learning by the learning unit 12 in accordance with the training data set and in response to input of the current state variable. In the present embodiment, since reinforcement learning is used as a learning algorithm by way of example, the function update unit 22 in the learning unit 12 updates the function for changing the gain of the magnetic flux controller 51 and the time constant of the magnetic flux estimator 52 based on the reward calculated by the reward calculation unit 21 in the learning unit 12, and the decision-making unit 13 selects, based on the updated function, the gain of the magnetic flux controller 51 and the time constant of the magnetic flux estimator 52 for which the most reward is obtained.

The motor control unit 14 commands either one of the power running action (rectification operation) that converts AC power to DC power and the regenerative operation (inversion operation) that converts DC power to AC power with respect to the inverter 102 as a drive command for controlling the speed, the torque or the position of the rotor of the motor 104 based on the gain of the magnetic flux controller 51 and the time constant of the magnetic flux estimator 52 determined by the decision-making unit 13 and using the speed command inputted from the speed command input unit 15, the operation program of the motor 104, the AC current or AC voltage at the AC motor side of the inverter 102 and/or the rotational speed of the motor 104. The motor control unit 14 includes the speed control unit 35 and the current control unit 36.

The speed control unit 35 in the motor control unit 14 includes a speed controller 41. The speed controller 41 generates a torque command based on the speed command inputted from the speed command input unit 15 and the speed of the motor 104 fed back from the speed detection unit 31. The speed controller 41 generates a torque command using a PI control, for example.

The current controller 36 in the motor control unit 14 includes a magnetic flux control unit 42, an excitation current controller 43, a two-phase/three-phase converter 44, a torque current command generator 45, and a torque current controller 46.

The magnetic flux control unit 42 includes the magnetic flux controller 51, the magnetic flux estimator 52, and a magnetic flux command generator 53, which serve to generate a torque as commanded by a torque command to generate an excitation current command from the torque command, as illustrated in FIG. 7A.

The magnetic flux command generator 53 in the magnetic flux control unit 42 generates a magnetic flux command from a torque command inputted from the speed controller 41.

The magnetic flux controller 51 in the magnetic flux control unit 42 generates an excitation current command based on the magnetic flux command generated by the magnetic flux command generator 53 and a magnetic flux estimation value generated by an estimation process by the magnetic flux estimator 52. The magnetic flux controller 51 is defined by a PI controller, for example, and the gain thereof is determined by the decision-making unit 13.

The magnetic flux estimator 52 in the magnetic flux control unit 42 calculates a magnetic flux estimation value from the excitation current command generated by the magnetic flux controller 51. The time constant of the magnetic flux estimator 52 is determined by the decision-making unit 13. The magnetic flux estimator 52 includes a filter gain 61 and a delay circuit 62 as illustrated in FIG. 7B. The value of the filter gain 61 is determined depending on the time constant and control cycle of the magnetic flux estimator 52.

The excitation current controller 43 generates an excitation control voltage command based on the excitation current command generated by the magnetic flux control unit 42 and the excitation current of the motor 104 detected via a current sensor (not illustrated). The excitation current controller 43 generates the excitation control voltage command using a PI control, for example.

The torque current command generator 45 generates a torque current command from the torque command.

The torque current controller 46 generates a torque control voltage command based on the torque current command generated by the torque current command generator 45 and the torque current of the motor 104 detected via a current sensor (not illustrated). The torque current controller 46 generates the torque control voltage command using a PI control, for example.

The two-phase/three-phase converter 44 converts the excitation control voltage command generated by the excitation current controller 43 and the torque control voltage command generated by the torque current controller 46 to a three-phase voltage command. The three-phase voltage command thus obtained is used as a command for controlling the switching element in the inverter 102. Further, the two-phase/three-phase converter 44 converts a three-phase current flowing to the motor 104 to a two-phase current (i.e., d-axis current and q-axis current). The excitation current and torque current thus obtained are inputted to the excitation current controller 43 and torque current controller 46, respectively.

Figure 10:
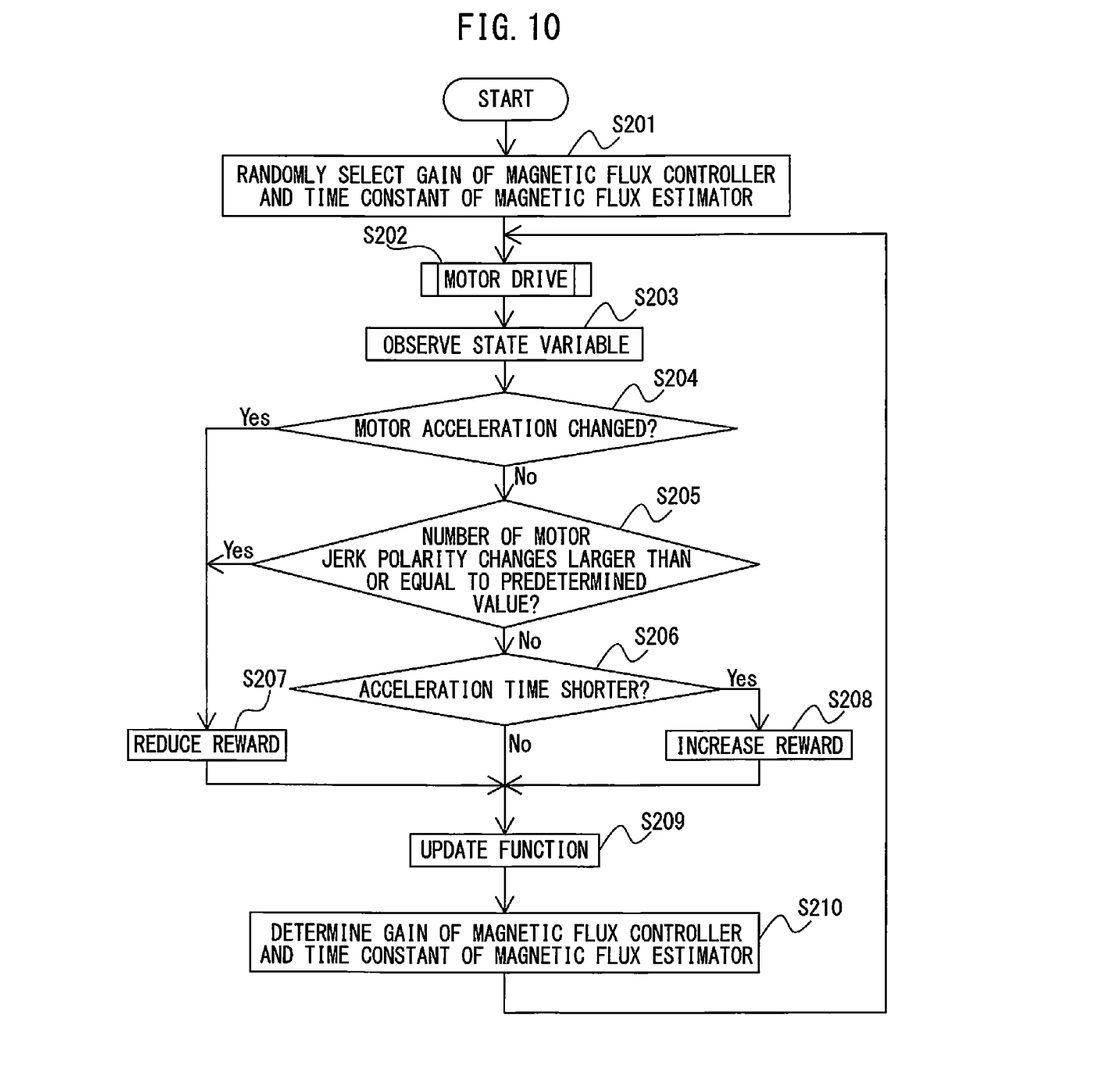
FIG. 10 is a flow chart illustrating an operation flow of a machine learning apparatus using reinforcement learning according to an embodiment.

FIG. 10 is a flow chart illustrating an operation flow of the machine learning apparatus using reinforcement learning according to the embodiment.

Generally, an initial value for an action is randomly selected in reinforcement learning. In the present embodiment, the gain of the magnetic flux controller 51 and the time constant of the magnetic flux estimator 52, which constitute the action, are randomly selected at step S201.

At step S202, the motor control unit 14 commands either of the power running operation (rectification operation) that converts AC power to DC power and the regenerative operation (inversion operation) that converts DC power to AC power as a drive command for controlling the speed, the torque or the position of the rotor of the motor 104 based on the gain of the magnetic flux controller 51 and the time constant of the magnetic flux estimator 52 set up with respect to the inverter 102 and using the speed command inputted from the speed command input unit 15, the operation program of the motor 104, the AC current or AC voltage at the AC motor side of the inverter 102, and/or the rotational speed of the motor 104. In this manner, the motor 104 drives. During this, the speed detection unit 31 detects the speed of the motor 104, the acceleration calculation unit 32 calculates the acceleration of the motor 104 from the speed detected by the speed detection unit 31, the jerk calculation unit 33 calculates the jerk from the acceleration of the motor calculated by the acceleration calculation unit 32, and the acceleration time measurement unit 34 measures the acceleration time of the motor 104.

At step S203, the state observation unit 11 observes a state variable defined by at least one of the data relating to the acceleration of the motor 104, the data relating to the jerk of the motor 104, and the data relating to the acceleration time of the motor 104. Meanwhile, although, in the present embodiment, these three data are made to be a state variable by way of example, at least one of these three data may be made to be a state variable.

At step S204, the state observation unit 11 determines, based on the data relating to the acceleration of the motor, whether the polarity of the acceleration of the motor 104 observed by state observation unit 11 is changed during an acceleration period or a deceleration period of the motor 104. When it is observed by the state observation unit 11 that the polarity of the acceleration of the motor 104 is changed, the reward calculation unit 21 reduces the reward at step S207. Meanwhile, when it is not observed by the state observation unit 11 that the polarity of the acceleration of the motor 104 is changed, the process proceeds to step S205.

At step S205, the state observation unit 11 determines, based on the data relating to the jerk of the motor, whether the number of times that the polarity of the jerk of the motor 104 observed by the state observation unit 11 is changed during an acceleration period or a deceleration period of the motor 104 is larger than or equal to a predetermined value. When the number of times that the polarity of the jerk of the motor 104 observed by the state observation unit 11 is changed is larger than or equal to the predetermined value, the reward calculation unit 21 reduces the reward at step S207. Meanwhile, when the number of times that the polarity of the jerk of the motor 104 is changed is smaller than the predetermined value, the process proceeds to step S206.

At step S206, the state observation unit 11 determines, based on the data relating to the acceleration time of the motor, whether the acceleration time of the motor 104 observed by the state observation unit 11 during an acceleration period or a deceleration period of the motor 104 is shorter than the acceleration time of the motor observed by the state observation unit 11 during an acceleration period or a deceleration period prior to the current acceleration period or deceleration period (i.e., the acceleration time is shorter). When it is determined by the state observation unit 11 that the acceleration time has become shorter, the reward calculation unit 21 increases the reward at step S208. When it is not determined that the acceleration time has become shorter, the process proceeds to step S209.

Meanwhile, the processes S204 to S206 may be performed with order interchanged.

At step S209, the function update unit 22 updates the function for changing the gain of the magnetic flux controller 51 and the time constant of the magnetic flux estimator 52 based on the reward calculated by the reward calculation unit 21.

At subsequent step S210, the decision-making unit 13 selects, based on the function updated at step S209, the gain of the magnetic flux controller 51 and the time constant of the magnetic flux estimator 52 for which the most reward is obtained. Then, the process returns to step S202, and thereafter, the processes of steps S202 to S210 are performed in repetition. In this manner, the machine learning apparatus 1 proceeds to learn the gain of the magnetic flux controller 51 and the time constant of the magnetic flux estimator 52 which can be optimized. Meanwhile, the training data set may be acquired from a plurality of the rectifiers 101; in such an instance, the learning unit 12 performs in repetition the processes of steps S201 to S210 in accordance with the training data set acquired with respect to the plurality of the rectifiers 101, and proceeds to learn the gain of the magnetic flux controller 51 and the time constant of the magnetic flux estimator 52. When the training data set is acquired with respect to the plurality of the rectifiers 101, the learning accuracy of the machine learning apparatus 1 is enhanced.

The state observation unit 11, the learning unit 12, and the decision-making unit 13, which have been described above, may be configured in a form of a software program, for example, and, alternatively, may be configured as a combination of a software program and a variety of electronic circuits. For example, when these are configured in a form of a software program, the functions of the above respective units can be achieved by causing an arithmetic processing device in the motor control apparatus 1000 to operate in accordance with the software program. Alternatively, the machine learning apparatus 1 including the state observation unit 11 and the learning unit 12 may be implemented as a semiconductor integrated circuit in which a software program that enables the function of each unit is written. Further alternatively, a semiconductor integrated circuit in which a software program that enables the function of each unit is written may be implemented in a form including not only the machine learning apparatus 1 including the state observation unit 11 and the learning unit 12 but also the decision-making unit 13.

Further, since the machine learning process is performed using data relating to the rotational speed of the motor measured by the speed detection unit 32 which the motor control apparatus 1000 inherently includes for drive-control of the motor, there is no need to provide a new hardware device as in the prior art, and thus such process can be retrofit to the existing motor control apparatus. In this instance, the semiconductor integrated circuit in which the software program that enables the functions of the respective portions of the machine learning apparatus 1 and the decision-making unit 13 is written may be incorporated into the existing motor control apparatus, or the software program per se that enables the functions of the respective portions of the machine learning apparatus 1 and the decision-making unit 13 may additionally be installed in the arithmetic processing device in the existing motor control apparatus. Further, it may be configured such that the machine learning apparatus 1 which has learnt the gain of the magnetic flux controller 51 and the time constant of the magnetic flux estimator 52 with respect to a certain motor control apparatus is attached to a separate motor control apparatus, and the gain of the magnetic flux controller 51 and the time constant of the magnetic flux estimator 52 are re-learnt and updated with respect to the separate motor control apparatus.

According to the present invention, it is possible to achieve a motor control apparatus that can automatically perform optimization of a gain of a magnetic flux controller and a time constant of a magnetic flux estimator, and a machine learning apparatus and a method therefor which can be used in the motor control apparatus.

According to the present invention, in a state in which the motor control apparatus is operated, no parameter adjustment work by the operator is required since the machine learning apparatus per se proceeds to learn and adjust so that the gain of the magnetic flux controller and the time constant of the magnetic flux estimator are optimized, thereby making it possible to reduce the man-hour for the parameter adjustment.

What is claimed is:

1. A motor control apparatus for controlling a motor, the motor control apparatus comprising:
    a motor control unit comprising a magnetic flux controller and a magnetic flux estimator;
    a machine learning apparatus configured to learn a gain of the magnetic flux controller and a time constant of the magnetic flux estimator, the machine learning apparatus comprising:
        a state observation unit configured to observe a state variable defined by at least one of data relating to an acceleration of the motor, data relating to a jerk of the motor, and data relating to an acceleration time of the motor; and
        a learning unit configured to learn the gain of the magnetic flux controller and the time constant of the magnetic flux estimator in accordance with a training data set defined by the state variable; and
    a decision-making unit configured to determine the gain of the magnetic flux controller and the time constant of the magnetic flux estimator based on a result of learning by the learning unit,
    wherein the motor control unit is configured to, in response to an input speed command, control a current of the motor based on the gain and the time constant determined by the decision-making unit.

2. The motor control apparatus according to claim 1, wherein the learning unit comprises:
    a reward calculation unit configured to calculate a reward based on the state variable; and
    a function update unit configured to update, based on the reward, a function for changing the gain of the magnetic flux controller and the time constant of the magnetic flux estimator.

3. The motor control apparatus according to claim 2, wherein the reward calculation unit is configured to reduce the reward when a polarity of the acceleration of the motor observed by the state observation unit is changed during an acceleration period or a deceleration period of the motor.

4. The motor control apparatus according to claim 2, wherein the reward calculation unit is configured to reduce the reward when the number of times that the polarity of the jerk of the motor observed by the state observation unit is changed during an acceleration period or a deceleration period of the motor is larger than or equal to a predetermined value.

5. The motor control apparatus according to claim 2, wherein the reward calculation unit is configured to increase the reward when the acceleration time of the motor observed by the state observation unit during a current acceleration period or a current deceleration period of the motor is shorter than an acceleration time of the motor observed by the state observation unit during an acceleration period or a deceleration period before the current acceleration period or the current deceleration period.

6. The motor control apparatus according to claim 1, wherein the learning unit is configured to learn the gain of the magnetic flux controller and the time constant of the magnetic flux estimator in accordance with the training data set acquired with respect to a plurality of motor control apparatuses.

7. The motor control apparatus according to claim 1, further comprising:
   a speed detection unit configured to detect a speed of the motor;
   an acceleration calculation unit configured to calculate the acceleration of the motor from the speed of the motor detected by the speed detection unit;
   a jerk calculation unit configured to calculate the jerk of the motor from the acceleration of the motor calculated by the acceleration calculation unit; and
   an acceleration time measurement unit configured to measure the acceleration time of the motor,
   wherein the decision-making unit is configured to determine the gain of the magnetic flux controller and the time constant of the magnetic flux estimator based on the result of learning by the learning unit in accordance with the training data set and in response to input of a current state variable.

8. The motor control apparatus according to claim 7, wherein the learning unit is configured to relearn and update the gain of the magnetic flux controller and the time constant of the magnetic flux estimator in accordance with an additional training data set defined by the current state variable.

9. A motor control method for controlling a motor by a motor control unit comprising a magnetic flux controller and a magnetic flux estimator, the motor control method comprising:
   observing a state variable defined by at least one of data relating to an acceleration of the motor, data relating to a jerk of the motor, and data relating to an acceleration time of the motor;
   learning a gain of the magnetic flux controller and a time constant of the magnetic flux estimator in accordance with a training data set defined by the state variables;
   determining the gain of the magnetic flux controller and the time constant of the magnetic flux estimator based on a result of said learning; and
   controlling the motor based on the gain and the time constant determined by said determining.

* * * * *